United States Patent [19]

Tomazic

[11] Patent Number: 5,607,788
[45] Date of Patent: Mar. 4, 1997

[54] ZINC-BROMINE BATTERY WITH CIRCULATING ELECTROLYTES

[75] Inventor: Gerd Tomazic, Murzzuschlag, Austria

[73] Assignee: Elin Energieanwendung GmbH, Vienna, Austria

[21] Appl. No.: 392,901

[22] PCT Filed: Aug. 30, 1993

[86] PCT No.: PCT/AT93/00134

§ 371 Date: Apr. 24, 1995

§ 102(e) Date: Apr. 24, 1995

[87] PCT Pub. No.: WO94/06167

PCT Pub. Date: Mar. 17, 1994

[30] Foreign Application Priority Data

Sep. 1, 1992 [AT] Austria ..................... 1741/92

[51] Int. Cl.$^6$ ................................. H01M 2/40
[52] U.S. Cl. ............... 429/72; 429/105; 429/199; 429/210
[58] Field of Search ................. 429/71, 72, 51, 429/105, 82, 199, 210

[56] References Cited

U.S. PATENT DOCUMENTS 4,614,693 9/1986 Hashimoto et al. .

FOREIGN PATENT DOCUMENTS

| 0167517 | 1/1986 | European Pat. Off. . |
| 0165000 | 11/1987 | European Pat. Off. . |
| 0327528 | 8/1989 | European Pat. Off. . |
| 0438044 | 7/1991 | European Pat. Off. . |
| 3-143420 | 6/1991 | Japan . |

OTHER PUBLICATIONS

International Search Report and Annex (Dec. 1993).
Patent Abstracts of Japan, vol. 15, No. 361 (C–867) dated Sep. 12, 1991.

*Primary Examiner*—John S. Maples
*Attorney, Agent, or Firm*—Greenblum & Bernstein P.L.C.

[57] ABSTRACT

Zinc-bromine battery with circulating electrolytes, motor-driven pumps with pump chambers, containers for the electrolytes, dipolar electrodes and separators of synthetic material fitted between them, in which the edges of the separators and the electrodes are welded together, and electrolyte inlet and outlet lines allocated to the electrode chambers thus formed, and possibly heat exchangers for the electrolytes. One gas and liquid-proof chamber unit with at least one container, catholyte inlet and outlet lines, a pump chamber and cathode chambers is formed which is connected to another gas and liquid-proof chamber unit consisting of another container, anolyte inlet and outlet lines, another pump chamber and anode chambers, especially solely via separators.

11 Claims, 1 Drawing Sheet

2

ZINC-BROMINE BATTERY WITH CIRCULATING ELECTROLYTES

BACKGROUND OF THE INVENTION

1. Field of the Invention

The invention relates to a zinc-bromine battery with circulating electrolytes, motor-driven pumps with pump chambers, containers with a pressure equalization for the electrolytes, bipolar electrodes and separators disposed between them, which are constructed of plastic, wherein the frames of the separators and the frames of the electrodes having a greater thickness than the center part of the electrodes are welded together and electrolyte supply and return lines associated with the electrode chambers formed in this way and, if required, heat exchangers for the electrolytes.

2. Description of Background and Relevant Invention

The electro-chemical pairing of zinc and bromine is of increasing importance for the accumulation of current. These systems are used stationary for the accumulation of current in place of emergency power-generating units, such as Diesel engines and generators, for example, but also as an energy source for traction. In both cases weight is not of preponderant importance, but additional units can be employed as with the zinc-bromine battery.

However, zinc-bromine batteries are also known wherein not only the zinc is stored at the electrode, but in this case the precipitated bromine is present in a porous mass of activated charcoal. The storage capacity of such batteries is extraordinarily small and dentrites in the course of the precipitation of zinc are particularly disturbing, so that only low current densities can be employed.

Zinc-bromine batteries with two circulating electrolyte fluids have two particular advantages. On the one hand, interference because of the growth of dentrites is kept low and on the other hand it is possible to participate in the determination of the capacity of the battery by means of the amounts of circulating electrolytes.

The material for producing a zinc-bromine battery was changed more and more to the use of plastics, in particular polyolefins and in this case polypropylene. These plastics have excellent chemical resistance but, on the other hand, have various disadvantages. It is necessary to design the electrodes as well as the separators as particularly thin-walled elements, on the one hand for reasons of electrical resistance, on the other hand to minimize the use of material. However, with such thin-walled elements there is the disadvantage that the desired geometrical shape, a plane as a rule, leads to undesirable preferred flow forms even from small causes, for example different temperatures in the electrolyte or pressure differences between the anolyte and the catholyte. In this case it is necessary to take into consideration that the electrolytes flow through chambers having, for example, an area of 30 cm ×30 cm, and the layer thickness of the flow can be from 1 mm to 2 mm. If deformations in the plastic occur, the mentioned irregularities in the flow appear, because of which different precipitations and dissolution of the zinc film occur, wherein it is possible for local heating to appear which, in turn, can result in the premature destruction of the battery.

In connection with zinc-bromine batteries made from plastics it is furthermore known that leaky spots occur again and again, for example at the edges of the electrodes and separators, even under strong mechanical pressure at the places to be sealed, so that such batteries cannot always be used.

A galvanic element, in particular a rechargeable zinc-bromine battery, is known from EP 438 044, wherein the connecting line for pressure equalization terminates in the area of the highest point of the collecting line when the element is in the normal position. It is disadvantageous in this case that the electrolyte can run out if the element is tilted, for example by 90°. Possible contamination of the environment by the electrolyte would have incalculable consequences.

SUMMARY OF THE INVENTION

It is the object of the instant invention to create a zinc-bromine battery which is suitable for the most diverse employment. It is intended in particular to create a small unit which can supply, for example, 150 to 500 watt/hours, and thus allows the long operation of various electrical consumers, for example drills, lawnmowers, but also radios, transmitters, television sets and the like.

The zinc-bromine battery in accordance with the invention is based on a state of the art as represented by EP-B1 0 167 517.

The zinc-bromine battery in accordance with the invention is distinguished in that by means of respectively one container, catholyte supply and return lines, pump with a further container, anolyte supply and return lines, a further pump chamber and anode chambers, is exclusively connected via separators, and that two chambers are provided between the two electrolyte containers for pressure equalization, which are separated from each other by a rubber-elastic diaphragm.

By employing electrodes and separators made of plastic, materials which have been proven in connection with zinc-bromine batteries could be used, wherein the connection of the edges, be it by means of welding with or without additional welding materials, i.e. that for example an additional film made from the material of the separators is applied normally in connection with the extent of the separators and electrodes, wherein simultaneously the edges are also brought to melting and are connected. As it is known, the employment of bipolar electrodes makes, on the one hand, higher voltages possible, and on the other hand the need for space is minimized by this. For extreme conditions it may be advantageous to take into account the temperature control, in particular cooling, of the electrolyte fluids via heat exchangers.

Due to the fact that respective gas- and fluid-proof spatial units are formed which, in particular exclusively, are connected via the separators, a battery is created which assures operation even under unfavorable conditions, wherein at the same time no leakages of the electrolyte fluid can occur, so that a battery with particularly low maintenance requirements is provided. In this connection it is of particular advantage that with such a battery, even if it is not maintained, for example charged, during storage as required with other batteries, no destruction of the system occurs, instead it is only necessary for storing the battery to connect it again to a charging device, so that the original capacity is again achieved.

If pressure equalization is provided between both electrolyte containers, a deformation of the electrodes and separators as a result of pressure differences can be particularly easily prevented, even with different pressure generation in the electrolytes such as can occur, for example, because of irregular pump operation, clogs in the lines, or the like.

If both pumps are driven by one motor, this provides on the one hand a weight savings in a particularly simple manner wherein, on the other hand, even flow speeds of the anolyte as well as for the catholyte are provided.

If the fluid take-up capability of the containers at least corresponds to the respective amounts of anolyte and catholyte, discharge of the battery during prolonged periods of idleness can be prevented by removing the electrolyte from the electrode chambers.

If the containers are arranged next to each other in relation to the electrodes, it is possible to provide a particularly simple structural embodiment in respect to the flow since, for example, the pumps can be disposed in an advantageous fluidic manner. A further advantage consists in that a simple draining of the electrolyte from the electrolyte chambers can be performed by a simple tilting of the battery, i.e. an arrangement of the battery in the form where the containers are at the bottom and the electrodes on the top, provided that essentially the entire amount of electrolyte can be received in the containers.

A particularly advantageous embodiment of the battery in accordance with the invention is provided if in the operational state of the battery the containers for the electrolyte fluid are disposed above the electrodes, because in that case a particularly good flow through the electrode chambers can be performed, while taking the possibly occurring gas bubbles into consideration.

If the container has a closeable opening for removing and replenishing the electrolyte fluid, it is possible, for example, to store the zinc-bromine battery, i.e. purely the plastic parts with the pump and the like, dry for sales purposes, and only filling with electrolyte needs to be performed at the place of use.

A particularly simple and compact embodiment of the battery results if the separators and/or the electrodes have continuous openings at their edges, for example the welded frames, which are matched to each other and form the electrolyte supply or return lines, each of which has branch lines into the electrode chambers. By means of such an embodiment it is possible to achieve a particularly compact battery, wherein at the same time additional lines which are present outside the package can either be completely avoided or reduced to a minimum.

If an electric fuse is disposed between the end contact of an electrode and the drain of an electrode it is possible to avoid too great current loads on the battery as well as the user.

If the battery has at least one handle, particularly two gripping strips located opposite each other, it is possible to manipulate such a battery particularly simply, which is known per se.

The method in accordance with the invention for storing a zinc-bromine battery essentially consists in that a directed discharge of the battery with the electrolytes being circulated is performed and the battery is then stored in the discharged state. Along with a particularly simple design of the battery, such as is required for wide application, a particularly simple system for storing the battery must also be provided which completely prevents damage during storage. This is made possible by a complete directed discharge, in the course of which the electrolyte is kept circulating to void thermal loads on the battery.

If the electric drive of the pumps for the electrolyte is employed as the preferably sole user during the directed discharge, it is assured that during discharge the electrolyte is compulsorily kept circulating, in which case no additional users are required, for example resistors by means of which electrical energy is changed into heat.

BRIEF DESCRIPTION OF THE DRAWINGS

The invention will be described in detail below by means of the drawings.

Shown are in.

DETAILED DESCRIPTION OF THE PREFERRED EMBODIMENTS

The electro-chemical system, namely the one for a zinc-bromine battery with circulating aqueous electrolytes and a complexing agent for the molecular bromine, wherein the complexing agent as such is water-soluble, but the complex itself is hard to dissolve in water, is described in EP-B1 0 167 517, which is a part of the instant invention.

The production of packages of electrodes which are built up of carbon-bonded polyethylene and have a frame of an electro-chemically inactive material, as well as separators of polyethylene also having a welded frame, wherein the edges of the electrodes as well as the separators are directly connected with each other, so that a package of alternating electrodes and separators is created which are welded together at their edges, wherein the electrodes act as bipolar electrodes, is described in EP-B1 0 167 517, which is a part of the instant invention.

Figure 1:
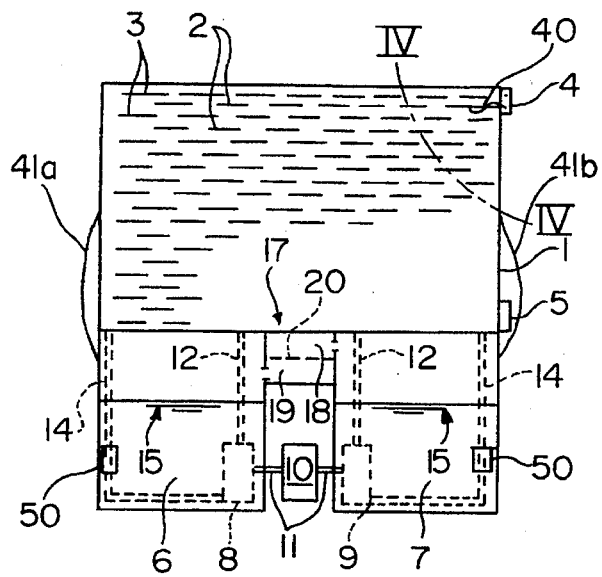
FIGS. 1 and 2, two batteries with containers in a schematic representation.
Figure 2:
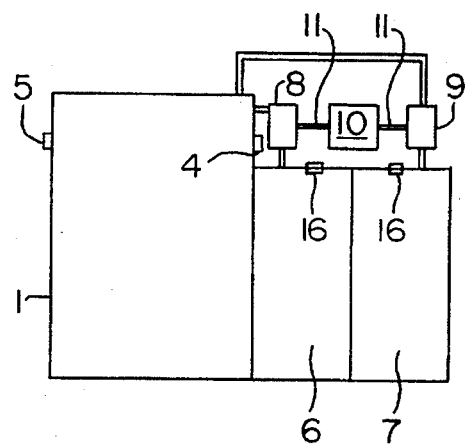

The zinc-bromine battery shown in FIGS. 1 and 2 in a front and a top view has a package 1 of electrodes and separators arranged one behind the other. In the embodiment in accordance with FIGS. 1 and 2 the electrodes 2 as well as the separators 3 are disposed horizontally, as indicated by dashed lines in FIG. 1. The battery is shown in a front view and in a position of rest in FIG. 1. No dissolution of the zinc films on the electrodes can occur because no electrolyte is present in the electrode chambers. Branch lines 4, 5 are located at both ends of the cell package and represent the positive and negative poles of the battery. An electric fuse 40, by means of which electrical overloads and therefore thermal loads of the battery can be assuredly prevented, can be disposed between the end contact of one or both electrodes disposed at the end, which in this case are not embodied as bipolar electrodes and instead have a collector grid, for example of silver. In the position of rest, containers 6 for the anolyte and 7 for the catholyte are disposed below the package 1 of electrodes and separators. In the operating position the battery is arranged by being turned over in such a way that the containers come to lie above the package of electrodes and separators. Pump chambers 8 and 9 are disposed in the containers 8 and 9, wherein the appropriate pump elements, namely turbine wheels, are driven by means of the common motor 10 and shafts 11. The pumps aspirate the electrolyte fluid through an aspirating connector 12 disposed on the bottom in the operating position and pump it via the electrolyte supply lines 14 into the anode or cathode chambers. The electrolyte is returned back into the container via electrolyte return lines, only partially illustrated. As can be seen from the fluid level 15, the containers are embodied such that the entire electrolyte volume can be received in the containers, so that during extended periods of idleness the charged battery can be stored without having electrolyte in the anode and cathode chambers. The container, the cell package, the pump chambers as well as the corresponding supply and return lines for the electrolyte are connected with each sealed against gas and fluid, so that two spatial units, namely one for the catholyte fluid and the other for the anolyte fluid, are formed, which are only connected with each other in an electro-chemical manner via separators. Sealing of the pump shafts against the pump chambers, such as it is particularly required in connection with the embodiment in accordance with FIG. 2, since there the pump chambers are not disposed inside the electrolyte containers, takes place by means of O-ring seals. The gas- and fluid-sealed closure of the containers can take place via rotatable plugs 16. As represented in FIG. 1, the containers 6 and 7 are connected with each other via a pressure equalizer 17. This pressure equalizer has two chambers 18 and 19 which are separated from each other by means of a rubber-elastic diaphragm 20. If there is now a pressure increase in the container 6 or 7, the diaphragm 20 is stretched into the chamber 18 or 19 until an appropriate pressure equalization is again assured by the volume equalization.

With electrodes which are not disposed horizontally, the supply of electrolyte takes place in such a way that it enters the lower area of the electrode chamber and is drawn off in the upper area. An assured flow through the electrode chamber is achieved by means of this. Although additional measures for counter flows which flow between the individual cells via the electrolyte supply and return lines are as a rule not required for certain areas of employment, it is possible to provide known measures, such as the application of counter-potentials to compensate for leak currents, or blocking elements which prevent the connection of the individual electrolyte chambers via the electrolyte during short or prolonged idle times, such as cocks with a plurality of openings so that all supply and return lines can be shut or opened with one turn of the cock.

Figure 3A:
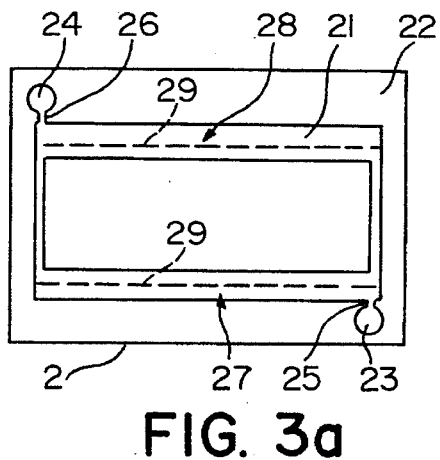
FIG. 3a, an electrode.

An electrode 2 is represented in FIG. 3a, wherein a central part 21 consisting of graphite-bonded polyethylene is surrounded by a frame 22, wherein the elements 21 and 22 are connected flat by welding. The element 22 has lower openings 23 and upper openings 24. The frame is of a greater thickness than the center part, i.e. the actual electrode, so that a hollow space can be formed by adjoining separators. Branch lines 25 and 26 respectively go off the openings 23 and 24 and terminate in a distributor system 27, 28, which is intended to make possible an even distribution of the electrolyte in the electrode chamber. Preferred areas for the flow are formed by the flow baffles 29, so that an even flow-through is assured. The two cross-sectional surfaces of the openings 23 and 24 can either have a continuously even cross section or they can be such that the inflow is embodied to be tapering or enlarged as a function of the pressure distribution. It is also possible, as known per se, to provide a compensating flow in this supply line by the arrangement of electrodes at their ends and beginnings.

Figure 3B:
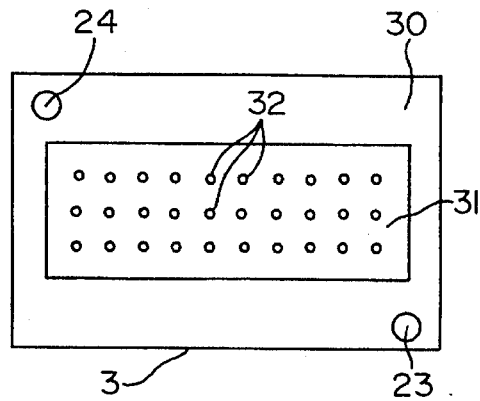
FIG. 3b, a separator, each in a top view.

A separator 3 is illustrated in FIG. 3b having a frame 30 which is essentially electro-chemically inactive and into which the inner part 31, the actual separator, is welded. As shown here, it can have cylinder-shaped protrusions 32 which, on the one hand, contribute to stabilizing the electrode chamber and, on the other hand, make turbulent flows in the electrode chamber possible, so that boundary layers of the fluid adhering to the electrodes and separators are released. The separators also have openings 23 and 24, which cooperate with the corresponding ones of the electrodes and form continuous supply lines and return lines.

Figure 4:
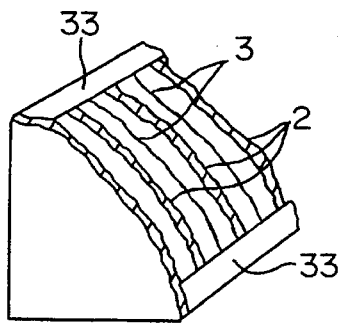
FIG. 4, a section of the battery of FIG. 1 along the line IV.

As can be seen from FIG. 4, the electrodes 2 and separators 3 are respectively welded together in their edge area 33 so that anode or cathode chambers are created which are respectively bounded by one surface of the bipolar electrode and the separator.

Such a battery can have a handle, for example, depending on the requirements or can have to gripping strips 41a, 41b so that handling the battery is simpler.

Furthermore, such a battery can have a plug connection in place of the two branch lines 4, 5, such as is known from other easily portable accumulators. In this way it is possible to connect such a portable accumulator for example to drills, hedge clippers, chain saws, but also to other portable electric tools. If the accumulators become discharged either through use or storage, their charging can take place by means of a charge device and the normal electrical power supply. It is of particular importance in this connection that it is possible to keep the charge times for zinc-bromine batteries particularly short in comparison with other electro-chemical accumulators since high current densities are possible, in particular because of the circulating electrolyte.

Such a self-contained battery is particularly suited for lawnmowers. In this case it is possible, for example, to either drive the roller or the cutter with which the grass is cut by means of an electric motor which is turned on with an electric switch. The electric drive for the pumps, namely the motor, is always connected to the voltage of the battery. In this way it is assured that, for example at the end of a mowing operation, the pumps run until the battery is completely electrically discharged. If required, a switch member can be provided in the circuit between the battery and the motor for the pumps, which makes it possible to take the pumps temporarily out of action. This can be of interest in cases where the mowing operation is disrupted, so that no current is to be generated by the circulation of the electrolyte. Such a switch can have a time delay element which, for example after five or ten minutes, compulsorily places the pumps into operation again, in which case it is furthermore necessary that, together with switching the electric motor for the lawnmower on, the electric circuit for the pump motor is also closed again. In any case, it is assured by means of this that when the battery is stored, it is changed to the discharged state and thermal loads because of the circulation of the electrolyte are prevented. However, it is then necessary to charge the battery before putting it into operation. Since zinc-bromine batteries can be exposed to relatively large current loads, a battery with a capacity of 600 W/h at a voltage of 48 Volt can be fully charged within 1½ hours at most. If, however, only an area of for example 100 $m^2$ is to be tended, a charge time of approximately 10 minutes is already sufficient.

A lawnmower operated by a zinc-bromine battery has, besides the advantage of an electric drive, known per se, that there are no additional emissions, also the particular advantage that the zinc-bromine battery as such achieves an additional noise suppression, since it can cover the motor and is constructed of materials which conduct sound badly. In this way such a lawnmower, operated by d.c. current, has a noise level of only 51 dB at a distance of approximately 1 m.

For peak loads during charging or even during operation it may be desirable to provide an individual heat exchanger 50 in each electrolyte circuit for heat removal.

I claim:

1. A zinc-bromine battery comprising:

first and second gas- and fluid-proof reservoirs;

a first and second motor driven pump;

an electrolyte to be circulated by said first and second motor driven pumps;

each of said first and second gas- and fluid-proof reservoirs including a pump chamber coupled to a respective one of said first and second motor driven pumps;

means for equalizing pressure between said first and second gas- and fluid-proof reservoirs;

an electrode chamber including a plurality of bipolar electrodes and a plurality of plastic separators, said separators disposed between said bipolar electrodes, each of said bipolar electrodes and said separators comprising an outer frame and an inner portion, said outer frame having a thickness greater than the thickness of the inner portion;

a plurality of electrolyte supply lines coupling said first and second motor driven pumps to said electrode chamber;

a plurality of electrolyte return lines coupling said electrode chamber to said first and second motor driven pumps;

said first gas- and fluid-proof reservoir comprising a first electrolyte supply line and a first electrolyte return line and said second gas- and fluid-proof reservoir comprising a second electrolyte supply line and a second electrolyte return line; and said pressure equalization means comprising a rubber elastic diaphragm, said diaphragm separating said electrolyte in said first gas- and fluid-proof reservoir from said electrolyte in said second gas- and fluid-proof reservoir, wherein each of said first gas- and fluid-proof reservoir and said second gas- and fluid-proof reservoir further comprise a heat exchanger for removing heat from said electrolyte.

2. A zinc-bromine battery in accordance with claim 1, wherein said first and second motor driven pumps can be driven by a common motor.

3. A zinc-bromine battery in accordance with claim 1, wherein a fluid take-up capability of the reservoirs at least corresponds to respective anolyte and catholyte volumes.

4. A zinc-bromine battery in accordance with claim 1, wherein in the operating position of the battery the reservoirs are disposed above electrodes and separators.

5. A zinc-bromine battery in accordance with claim 3, wherein in an operating position of the, battery the reservoir are disposed above the electrodes and separators.

6. A zinc-bromine battery in accordance with claim 1, wherein each reservoir has a closable opening for removing and replenishing the electrolyte fluid.

7. A zinc-bromine battery in accordance with claim 1, wherein the separators and/or the electrodes have at their edges, welded frames, continuous openings aligned with each other, by means of which continuous channels are formed as electrolyte supply and return lines which respectively have branch lines into the electrode chambers.

8. A zinc-bromine battery in accordance with claim 1, wherein an electric fuse is disposed between an end contact of an electrode and a branch line to the user.

9. A zinc-bromine battery in accordance with claim 1, wherein the battery has at least one handle, in particular two strips located opposite each other.

10. A zinc-bromine battery in accordance with claim 1, wherein a directed discharge of the battery is performed by means of circulating electrolyte and that thereafter the battery is stored in the discharged state.

11. A zinc-bromine battery in accordance with claim 1, wherein an electrical drive for the first and second motor driven pumps is a powered by directed discharge of said zinc-bromine battery.

* * * * *